Dec. 23, 1930.  L. S. WILBUR  1,785,850
SPLICE BAR OR FISH PLATE
Filed July 22, 1929  2 Sheets-Sheet 1
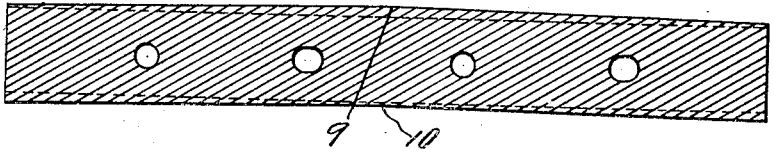
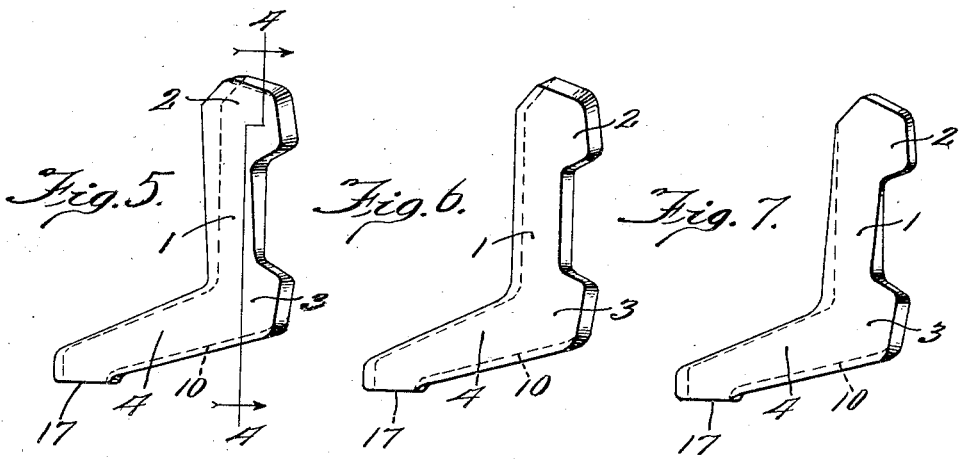
Inventor:
Lawrence S. Wilbur
By
Arthur F. Durand
Atty.

Dec. 23, 1930.          L. S. WILBUR          1,785,850
SPLICE BAR OR FISH PLATE
Filed July 22, 1929     2 Sheets-Sheet 2
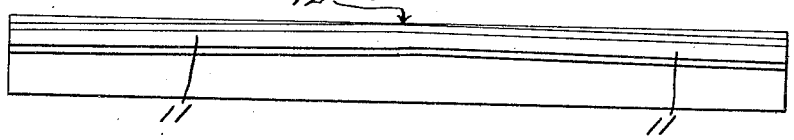
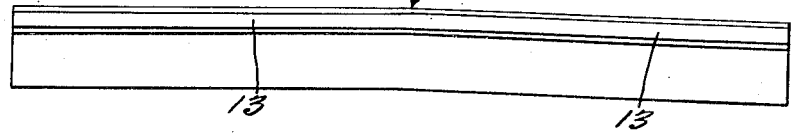
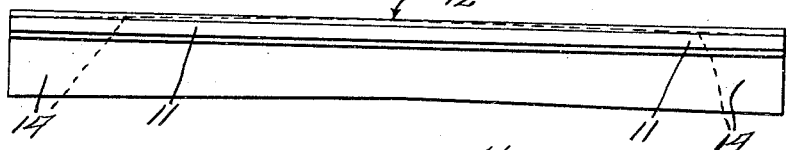
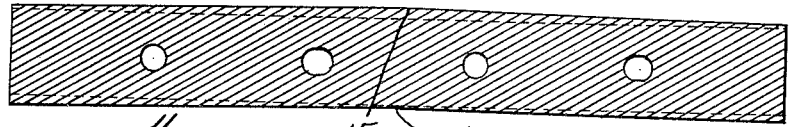
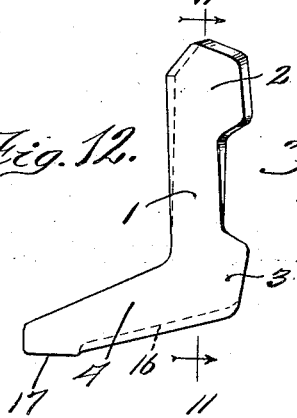
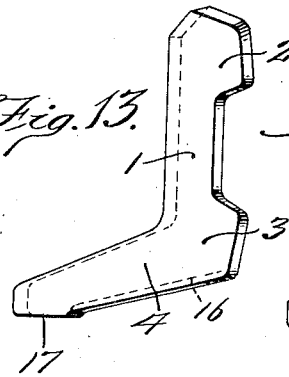
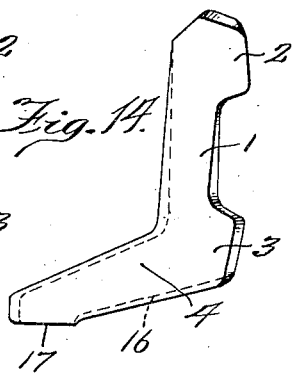
Inventor:
Lawrence S. Wilbur
By Arthur F. Durand
Atty.

Patented Dec. 23, 1930

1,785,850

UNITED STATES PATENT OFFICE

LAWRENCE S. WILBUR, OF EVANSTON, ILLINOIS

SPLICE BAR OR FISHPLATE

Application filed July 22, 1929. Serial No. 380,239.

This invention relates to splice bars or fish plates for use on rail joints, and more particularly to bars or plates for use on old and worn or distorted rails.

Generally stated, the object of the invention is to provide a novel construction and arrangement whereby a splice bar or fish plate for this purpose has a humped or crowned top, whereby the top slopes gently from the middle to the ends of the bar, and which bar is formed with a shallow recess on the bottom thereof, which recess is of maximum height at the middle of the bar and becomes gradually less toward the ends of the bar, whereby the bar is of greater fishing height at the middle than at the ends thereof, thereby adapting the bar or plate for use on old rails which have become worn and distorted by use.

It is also an object to provide certain details and features of construction and method steps and combinations tending to increase the general efficiency and desirability of splice bars of this particular character.

To the foregoing and other useful ends, the invention consists in the matters hereinafter set forth and claimed, and shown in the accompanying drawings, in which,—

Fig. 1 is a plan view of a splice bar embodying the principles of the invention.

Fig. 2 is a similar view, showing a different form of the invention.

Fig. 3 is a similar view, showing a different form of the invention.

Fig. 4 is a longitudinal vertical section of any one of said bars.

Fig. 5 is an enlarged end view of the bar shown in Fig. 1.

Fig. 6 is an enlarged end view of the bar shown in Fig. 2.

Fig. 7 is an enlarged end view of the bar shown in Fig. 3.

Fig. 8 is a plan view of a splice bar embodying the principles of the invention, showing still a different form of the invention.

Fig. 9 is a similar view, showing a different form of the invention.

Fig. 10 is a similar view, showing a different form of the invention.

Fig. 11 is a longitudinal vertical section through any one of the bars shown in Figs. 8, 9 and 10.

Fig. 12 is an enlarged end view of the bar shown in Fig. 8 of the drawings.

Fig. 13 is an enlarged end view of the bar shown in Fig. 9 of the drawings.

Fig. 14 is an enlarged end view of the bar shown in Fig. 10 of the drawings.

As thus illustrated, and referring to Figs. 1 and 5, the splice bar comprises the upright web portion 1 having the head portion 2 and the heel portion 3, the flange 4 being integral with the heel portion and extending downwardly and outwardly. Looking down on the bar, as shown in Fig. 1, it will be seen that it comprises an inwardly curved middle portion 5 disposed between the straight end portions 6, which are disposed at an angle to each other, and which straight portions and curved portion form obtuse angles 7 on the outer side of the bar. In this case, the straight portions 6 are the top or head only of the bar, the bottom portions 8 of the bar being straight and in exact alignment with each other.

In Figs. 2 and 6 the construction is similar, but in this case the straight top portions 6 are parallel with the straight bottom portions 8, whereby the straight end portions of the bar comprise the entire end portions of the bar from top to bottom thereof.

In Figs. 3 and 7 the construction is similar, but in this case the straight top end portions 6 are in exact alignment with each other, while the straight bottom portions 8 are disposed at an angle to each other, as shown.

However, in each of the three different forms of the invention shown, the bar comprises an inwardly curved middle portion disposed between two straight end portions, which latter may be either the top or bottom of the bar, or both, and in each case obtuse angles are formed where such straight portions meet the ends of the curved portion, these obtuse angles being on the outer side of the bar. Also, in each case, as shown in Figs. 4, 5, 6 and 7, the top of the bar is humped or crowned at its middle, as shown at 9 in Fig. 4 of the drawings, so that the top of the bar slopes gently from the middle thereof to the ends of the bar. Also, in each form of the invention thus shown, the bottom of the bar has a recess 10 therein, which recess is higher at the middle of the bar and tapers toward the ends of the bar. In each case, therefore, the middle portion of the bar projects inwardly and will reach farther up on the flanges of the meeting ends of the rails and will reach farther under the heads or tread portions of the rails, this being desirable, as on old rails the fishing height has usually become greater at the ends of the rails than at the ends of the splice bars. Thus bars of the kind shown and described are adapted to properly engage the sides of rails which have become worn and distorted by use, requiring splice bars of greater fishing height at the middle of the bar than at the ends thereof.

In Figs. 8 and 12 the splice bar comprises the same web 1 and head 2 and heel 3 and flange 4, but in this case the two straight end portions 11 of the bar, looking down on the bar, are formed by the head or top only of the bar, and the inner ends of these straight portions meet to form the obtuse angle 12 on the inner side of the bar. The entire flange 4 and heel 3 of the bar are straight from one end to the other of the bar, as shown.

In Figs. 9 and 13 the construction is similar, but in this case the straight end portions 13 are made up of both the top and bottom of the bar, the entire bar being bent to form the obtuse angle 12 at the middle of the bar.

In Figs. 10 to 14 the entire top of the bar is straight, so that the two end portions 11 of the top or head are in exact alignment with each other, but the heel 3 and flange 4 are bent or so formed that they form end portions 14 disposed at an angle to each other, forming the obtuse angle 12 again on the inner side of the bar.

Thus, in each of Figs. 8, 9 and 10, there are straight end portions disposed at an angle to each other, forming an obtuse angle on the inner side of the bar; and these straight end portions may be formed by the top or head only of the bar, or by the bottom only of the bar, or by both.

Also, in each of the different forms of the invention shown in Figs. 8, 9 and 10, as indicated in Figs. 11, 12, 13 and 14, the top of the bar is humped or crowned at 15, whereby the top of the bar slopes gently from the middle thereof toward the ends of the bar. In addition, each bar is provided with a cavity or recess 16 on the bottom thereof, similar to the recess 10 previously described, whereby the bar is of greater fishing height at the middle than at the ends thereof.

Of course, in cross section, the bar is of no greater height at its middle than at its ends, but this is not what is meant by the statement that the bars are each of greater fishing height at the middle than at the ends of the bar; for what is really meant is that when the bar is placed in position, and is resting on the flanges of the rails, the middle of the bar will be higher than its ends, whereby the top of each bar is of greater fishing height at its middle, measured vertically from the top surface of the rail flange, than at the ends of the bar.

The bars shown and described can be new bars, or they can be old bars reshaped and reformed in the desired manner. It is ordinarily less expensive, however, to form bars of this kind from old bars, than from new stock. Also, the bars shown and described can all be used in one and the same unitary structure, as by using different bars on the opposite sides of the same rail joint, or by using different forms on successive joints in the same general rail structure, whereby the different bars will co-operate with each other to maintain the continuity of the rails. Some of the bars shown will be better adapted for some rails than others, and vice versa, depending upon the worn or distorted condition of the rails.

If the bars or plates shown and described are made from old bars, they can be increased slightly in height, throughout the length of the bar, as by reducing the thickness of the web 1 of the bar, so that by a redistribution of the metal the bar will be of greater fishing height throughout its length than the original bar. The rails are subject to some wear, of course, not only at the middle of the rail joint, but also throughout the length of the splice bars, owing to the pounding of the car wheels and the creeping action of the rails. Hence, a reformed or remade bar, which is of slightly greater fishing height than the old bar, is or may be of some advantage applied to old rails.

It will be seen that in each case the lower lip or overhang 17 is exactly level on its lower side, as this lip does not rest on the flanges of the old rails, but, to the contrary, overhangs the edges of the rail flanges.

As shown in Figs. 1, 2 and 3, the angle bar has a camber on the inner side thereof.

What I claim as my invention is:

1. A splice bar or fish plate for connecting rails together, comprising a web having a head and a heel, with a flange integral with said heel, said heel and flange forming the base of the bar, said bar being so formed that in longitudinal vertical section through said web and head and heel the head is higher at the middle of the bar than at the ends thereof, while the bottom of the heel is also higher at the middle of the bar than at the ends thereof, thereby in effect providing a crowned or humped top and a recessed bottom, and whereby the bar is of greater fishing height at its middle than at the ends thereof, portions of the bar at the ends thereof being spaced outward further from the rail sides than a middle portion of the bar, when the bar is resting on the flanges of the rails.

2. A structure as specified in claim 1, said bar having straight end portions disposed at an angle to each other, when viewed from above.

3. A structure as specified in claim 1, said bar having straight end portions disposed at an angle to each other, when viewed from above which straight end portions are formed by only the top or head of the bar.

4. A structure as specified in claim 1, said bar having straight end portions disposed at an angle to each other, when viewed from above which straight end portions are formed by only the bottom of the bar.

5. A structure as specified in claim 1, said bar having straight end portions disposed at an angle to each other, when viewed from above which straight end portions are formed by both the head and bottom of the bar.

6. A structure as specified in claim 1, said bar having an inwardly curved middle portion disposed between straight end portions forming obtuse angles on the outer side of the bar, when viewed from above which angles are at the opposite ends of said inwardly curved middle portion.

7. A structure as specified in claim 1, said bar having straight end portions disposed at an angle to each other, when viewed from above said straight end portions forming an obtuse angle where they meet on the inner side of the bar.

8. A structure as specified in claim 1, said outwardly spaced bar end portions comprising only the head of the bar.

9. A structure as specified in claim 1, said outwardly spaced bar end portions comprising both the head and heel of the bar.

10. A structure as specified in claim 1, said outwardly spaced bar end portions comprising only the base of the bar.

11. A structure as specified in claim 1, said bar having a camber on the inner side thereof.

12. A structure as specified in claim 1, said bar being of uniform distance from the top to the bottom throughout the length thereof.

Specification signed this 29th day of June, 1929.

LAWRENCE S. WILBUR.